(12) United States Patent
Son et al.

(10) Patent No.: US 8,624,894 B2
(45) Date of Patent: Jan. 7, 2014

(54) APPARATUS AND METHOD OF EARLY PIXEL DISCARDING IN GRAPHIC PROCESSING UNIT

(75) Inventors: Sung Jin Son, Yongin-si (KR); Seok Yoon Jung, Seoul (KR); Chan Min Park, Seoul (KR); Kyoung June Min, Yongin-si (KR); Sang Oak Woo, Anyang-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 255 days.

(21) Appl. No.: 13/067,411

(22) Filed: May 31, 2011

(65) Prior Publication Data

US 2012/0069021 A1  Mar. 22, 2012

(30) Foreign Application Priority Data

Sep. 20, 2010 (KR) ........................ 10-2010-0092377

(51) Int. Cl.
*G06T 15/40* (2011.01)

(52) U.S. Cl.
USPC .......................................... 345/422; 345/426

(58) Field of Classification Search
USPC .................................................. 345/422, 426
See application file for complete search history.

(56) References Cited

U.S. PATENT DOCUMENTS

| | | | |
|---|---|---|---|
| 6,476,807 B1 * | 11/2002 | Duluk et al. ................... | 345/421 |
| 6,930,684 B2 * | 8/2005 | Tjew .............................. | 345/421 |
| 7,385,608 B1 * | 6/2008 | Baldwin ........................ | 345/506 |
| 8,094,152 B1 * | 1/2012 | Myers et al. .................. | 345/422 |
| 2002/0130886 A1 * | 9/2002 | Baldwin ........................ | 345/611 |
| 2003/0011594 A1 * | 1/2003 | Park et al. ..................... | 345/422 |
| 2003/0164825 A1 * | 9/2003 | Baldwin et al. ............... | 345/419 |
| 2003/0164830 A1 * | 9/2003 | Kent .............................. | 345/505 |
| 2003/0164840 A1 * | 9/2003 | O'Driscoll .................... | 345/611 |
| 2004/0246260 A1 * | 12/2004 | Kim et al. ..................... | 345/557 |
| 2005/0195187 A1 | 9/2005 | Seiler et al. | |
| 2005/0195198 A1 * | 9/2005 | Anderson et al. ............. | 345/506 |
| 2006/0098021 A1 * | 5/2006 | Rim et al. ..................... | 345/543 |
| 2007/0257905 A1 * | 11/2007 | French et al. ................. | 345/419 |
| 2007/0291030 A1 * | 12/2007 | Fowler et al. ................. | 345/422 |
| 2008/0059956 A1 * | 3/2008 | Su ................................. | 717/140 |
| 2008/0106551 A1 * | 5/2008 | Jung et al. ..................... | 345/506 |

(Continued)

FOREIGN PATENT DOCUMENTS

| | | |
|---|---|---|
| JP | 2006-127556 | 5/2006 |
| JP | 2009-181582 | 8/2009 |

(Continued)

OTHER PUBLICATIONS

Yu, Chang-Hyo; An Adaptive Spatial Filter for Early Depth Test; 2004; Circuits and Systems, ISCAS '04; vol. 2; pp. II-137-II-140.*

(Continued)

*Primary Examiner* — Maurice L McDowell, Jr.
(74) *Attorney, Agent, or Firm* — Staas & Halsey LLP

(57) ABSTRACT

A method to discard pixels early includes a first early depth test maintaining a depth value on a pixel to be discarded by a discard instruction, and a second early depth test updating the depth value on a pixel not to be discarded by the discard instruction. Because of the first and second early depth tests, a number of pixels to be processed by a pixel shading process may be reduced.

20 Claims, 10 Drawing Sheets

(56) References Cited

U.S. PATENT DOCUMENTS

2009/0284535 A1* 11/2009 Pelton et al. .................. 345/505
2010/0007662 A1* 1/2010 Cox et al. ...................... 345/420
2010/0141666 A1* 6/2010 Christopher et al. ......... 345/520

FOREIGN PATENT DOCUMENTS

| KR | 10-0478767 | 3/2005 |
| KR | 10-0485241 | 4/2005 |
| KR | 10-0887012 | 2/2009 |
| KR | 10-2009-0117809 | 11/2009 |
| KR | 10-2010-0051750 | 5/2010 |

OTHER PUBLICATIONS

Timo Aila et al; Delay streams for graphics hardware; 2003; SIGGRAPH '03 ACM SIGGRAPH 2003; vol. 22 Issue 3; pp. 792-800.*
Woo-Chan Park, et al. "An Effective Pixel Rasterization Pipeline Architecture for 3D Rendering Processors", IEEE Transactions on Computers, vol. 52, No. 11, Nov. 2003. (8pg).

* cited by examiner

```
varying vec2 texCoord;
varying vec3 eyePosition;
varying vec2 material;

void main() {
    vec3 normal;
    normal.xy = texCoord × 2.0 - 1.0;
    // make the ball circular
    float radius = 1.0 - dot( normal.xy, normal.xy);
    if (radius < 0.0)
        discard;
    normal.z = sqrt(radius);
    normal = normalize(normal);
    vec3 finalEyePos = eyePosition;
    finalEyePos.z += 1.5 / 12.0 × normal.z;
    gl_FragData[0] = vec4( finalEyePos, 0.0);
    gl_FragData[1] = vec4( normal × 0.5 + 0.5, 1.0);
    gl_FragData[2] = material;
}
```

820

```
varying vec2 texCoord;
varying vec4 oNormal;      ← 840 void main() {
    vec3 normal;
    normal.xy = texCoord × 2.0 - 1.0;
    // make the ball circular
    float radius = 1.0 - dot( normal.xy, normal.xy);
    if (radius < 0.0)
    {
        discard;
    }
    else
    {
        oNormal = vec4(normal, radius);   ← 850
    }
}
```

830

```
varying vec4 oNormal;              ← 860
varying vec3 eyePosition;
varying vec2 material;

void main() {
    vec3 normal = oNormal.xyz;
    float radius = oNormal.w;
    normal.z = sqrt(radius);
    normal = normalize(normal);
    vec3 finalEyePos = eyePosition;
    finalEyePos.z += 1.5 / 12.0 × normal.z;
    gl_FragData[0] = vec4( finalEyePos, 0.0);
    gl_FragData[1] = vec4( normal × 0.5 + 0.5, 1.0);
    gl_FragData[2] = material;
}
```

APPARATUS AND METHOD OF EARLY PIXEL DISCARDING IN GRAPHIC PROCESSING UNIT

CROSS-REFERENCE TO RELATED APPLICATIONS

This application claims the priority benefit of Korean Patent Application No. 10-2010-0092377, filed on Sep. 20, 2010, in the Korean Intellectual Property Office, the disclosure of which is incorporated herein by reference.

BACKGROUND

1. Field

Example embodiments relate to an apparatus and a method of early pixel discarding in a graphic processing unit.

More particularly, disclosed are an apparatus and a method of eliminating unnecessary pixels in advance in three-dimensional (3D) rendering operations to improve rendering performance.

2. Description of the Related Art

Three-dimensional (3D) rendering is image processing to synthesize 3D object data onto an image to be viewed from a viewpoint of a camera.

In order to generate a 3D image in real time, a rasterization process which generates an image by projecting a 3D object on a screen is widely used.

SUMMARY

The foregoing and/or other aspects are achieved by providing a three-dimensional (3D) rendering apparatus including a discard shading processor that performs a first early depth test maintaining a depth value and processing a discard shader to selectively discard a pixel, and a pixel shading processor that performs a second early depth test updating the depth value to selectively discard the pixel, and using a pixel shader to process the pixel, wherein the discard shading processor outputs a pixel not discarded to the pixel shading processor.

The discard shader may correspond to a part associated with a discard instruction, and the pixel shader may correspond to another part excluding the part corresponding to the discard shader.

The discard shading processor may include a first depth tester performing the first early depth test on the pixel to selectively discard the pixel, and a discard shader unit processing a pixel not discarded by the first depth tester using the discard shader and processing a discard instruction on the pixel to selectively discard the pixel, wherein the first depth tester may maintain a depth value of a depth buffer corresponding to the pixel.

The pixel shading processor may include a second depth tester performing the second early depth test on the pixel to selectively discard the pixel, and a pixel shader unit processing a pixel not discarded by the second depth tester using the pixel shader, wherein the second depth tester may update a depth value of a depth buffer corresponding to the pixel to a depth value of the discarded pixel when the pixel is discarded.

The 3D rendering apparatus may further include a discard determination unit determining whether the pixel is a target to be processed by the discard shading processor, wherein the discard determination unit may output the pixel to the discard shading processor when the pixel is the target to be processed by the discard shading processor, and may output the pixel to the pixel shading processor when the pixel is different from the target to be processed by the discard shading processor.

The 3D rendering apparatus may further include a rasterizer unit performing rasterization on the pixel and outputting the pixel to the discard determination unit, and a color blending unit receiving the pixel from the pixel shading processor and performing color blending on the pixel.

The discard determination unit may output the pixel to the discard shading processor when the pixel shader to process the pixel includes the discard instruction, and may output the pixel to the pixel shading processor when the pixel shader does not include the discard instruction.

The 3D rendering apparatus may further include a compiler unit dividing all pixel shader code with respect to the pixel into discard shader code and pixel shader code, compiling the discard shader code to generate the discard shader, and compiling the pixel shader code to generate the pixel shader, wherein the discard shader code may correspond to discard instruction code and previous code to the discard instruction among the all pixel shader code, and the pixel shader code may correspond to subsequent code to the discard instruction among the all pixel shader code.

Information about the pixel may be transmitted from the discard shade code to the pixel shader code by a variable in the discard shader code.

The example embodiments may provide a 3D rendering method including a discard shading process performing, by at least one processor, a first early depth test maintaining a depth value and processing a discard shader to selectively discard a pixel, and a pixel shading process performing, by the at least one processor, a second early depth test updating the depth value to selectively discard the pixel, and using a pixel shader to process the pixel, wherein a pixel not discarded in the discard shading process is processed in the pixel shading process.

The discard shading process may include a first depth testing performing the first early depth test on the pixel to selectively discard the pixel, and a discard shading processing a pixel not discarded by the first early depth test using the discard shader and processing a discard instruction on the pixel to selectively discard the pixel, wherein the first depth testing may maintain a depth value of a depth buffer corresponding to the pixel.

The pixel shading processor may include a second depth testing performing the second early depth test on the pixel to selectively discard the pixel, and a pixel shading processing a pixel not discarded by the second early depth test using the pixel shader, wherein the second depth testing may update, to a depth value of the discarded pixel, a depth value of a depth buffer corresponding to the pixel.

The 3D rendering method may further include a discard determining process to determine whether the pixel is a target to be processed in the discard shading process, wherein the discard shading process may be performed when the pixel is the target to be processed in the discard shading process, and the pixel shading process may be performed when the pixel is different from the target to be processed in the discard shading process.

The 3D rendering method may further include a rasterizing process performing rasterization on the pixel, and a color blending process performing color blending on the pixel.

The discard shading process may be performed after the discard determining process when the pixel shader to process the pixel includes the discard instruction, and the pixel shading process may be performed when the pixel shader does not include the discard instruction.

The discard shading process may perform a process represented by a discard shader code, and the pixel shading process may perform a process represented by a pixel shader code.

The discard shader code may correspond to discard instruction code and previous code to a discard instruction among all pixel shader code with respect to the pixel, and the pixel shader code may correspond to subsequent code to the discard instruction among the all pixel shader code.

The discard shading process may include a first varying data patching process extracting information about the pixel based on a variable in the discard shader code, and the pixel shading process may include a second varying data patching process extracting information about the pixel based on a variable in the pixel shader code.

According to another aspect of one or more embodiments, there is provided at least one non-transitory computer readable medium including computer readable instructions that control at least one processor to implement methods of one or more embodiments.

Additional aspects of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of embodiments, taken in conjunction with the accompanying drawings of which:

FIG. 8 illustrates generation of code of a compiler according to example embodiments;

DETAILED DESCRIPTION

Figure 1:
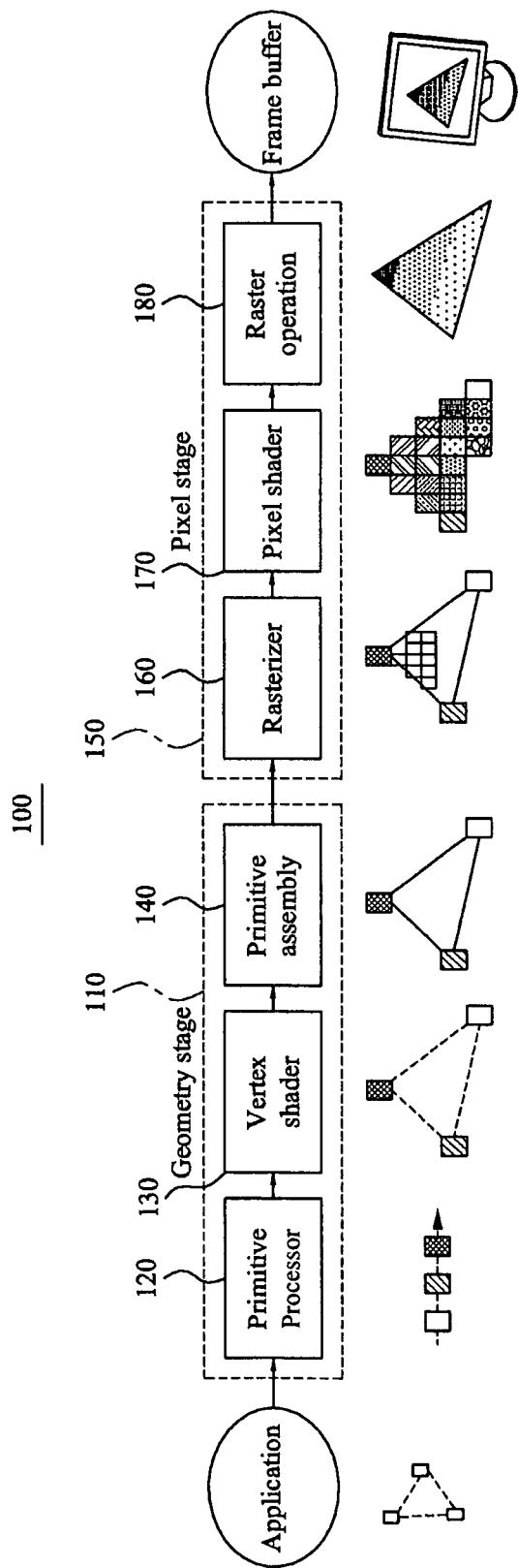
FIG. 1 illustrates a pipeline of a rasterization-based three-dimensional (3D) graphics rendering technique according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a pipeline 100 of a rasterization-based three-dimensional (3D) graphics rendering technique according to example embodiments.

The term 'pipeline' refers to parallel operations on different pixels in each stage.

The pipeline 100 may include a geometry stage 110 and a pixel stage 150.

In the geometry stage 110, transformation and a back-face culling of a vertex in a space may be performed, and a coordinate of the vertex may be projected to a screen.

In the pixel stage 150, based on projected coordinates of vertices, pixels may be generated in a triangle or a polygon formed by the vertices, and color values of the respective pixels may be calculated.

The geometry stage 110 may include a primitive processor 120, a vertex shader 130, and a primitive assembly 140.

The pixel stage 150 may include a rasterizer 160, a pixel shader 170, and a raster operation 180.

Figures in a lower part of FIG. 1 illustrate processing a vertex or a pixel in each stage.

The primitive processor 120 may obtain application-specific data and data structures from an application and generate vertices.

A shader is a group of software instructions. The shader may be generally used to calculate rendering effects in graphics hardware. The shader may be used to program a rendering pipeline programmable by a graphics processing unit (GPU).

The vertex shader 130 may be used once for each vertex provided to the GPU and transform a 3D position of each vertex in a virtual space into a 2D coordinate and a depth value of a Z-buffer to be displayed on a screen.

The primitive assembly 140 may collect runs of vertex data output from the vertex shader 130 and form the runs into a viable primitive, for example, a line, a point, and a triangle.

The rasterizer 160 may generate information about inside pixels by interpolating screen coordinates, texture coordinates, and the like, defined for each vertex in a primitive.

The pixel shader 170 may perform code realized by a shader programmer to perform complex per-pixel effects with respect to each inside pixel. The pixel shader 170 may calculate color of pixels by texture mapping and calculation of reflection of light, or discard a particular pixel using a discard instruction. The discard instruction may eliminate a particular pixel in a pixel shader from a pipeline. The eliminated pixel is different from an object to be rendered.

The raster operation 180 may perform a depth test and color blending to generate a raster image, such as pixels or dots, based on information about the pixels. The generated raster image may be copied into a frame buffer.

The frame buffer is a video output device that may drive a video display from a memory buffer containing a complete frame of data.

Figure 2:
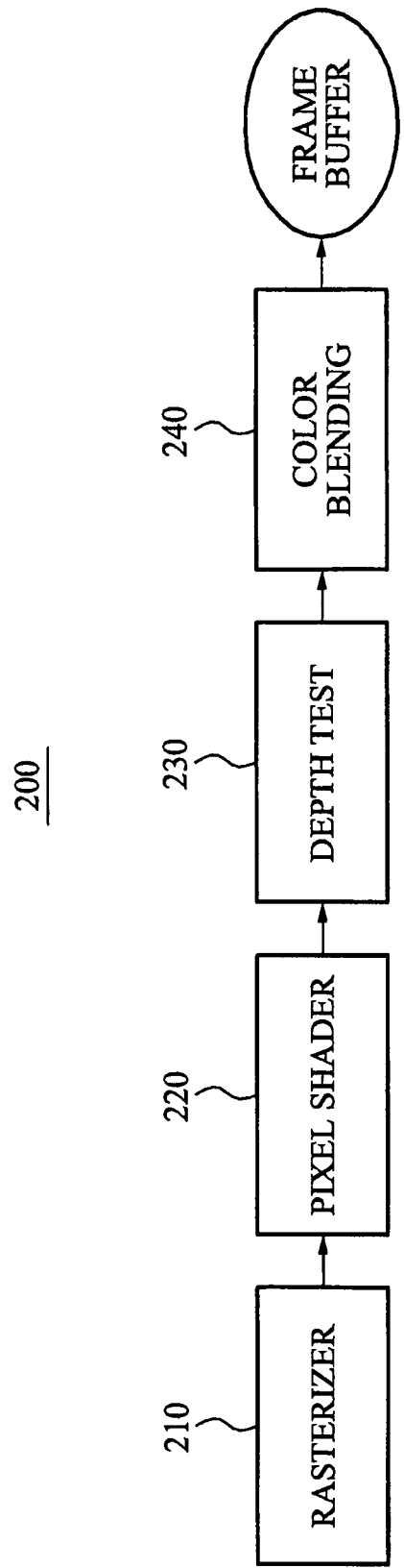
FIG. 2 illustrates a pipeline in a pixel stage according to example embodiments.

FIG. 2 illustrates a pipeline in a pixel stage according to example embodiments.

The pipeline 200 in the pixel stage may include a rasterizer 210, a pixel shader 220, a depth test 230, and color blending 240.

The rasterizer 210 corresponds to the rasterizer 150 of FIG. 1, and the pixel shader 220 corresponds to the pixel shader 160 of FIG. 1. Thus, redundant descriptions are omitted.

The raster operation 170 of FIG. 1 corresponds to the depth test 230 and the color blending 240.

The depth test 230 may be a process of discarding pixels distant from a camera among pixels having the same coordinate so that only an object which is the closest to the camera may be shown in a final image. When the object closest to the camera is transparent, a next object may be shown.

The depth test 230 may decrease a number of 3D rendering operations by representing only objects close to the camera as an image and early discarding pixels which are not displayed in the image.

The color blending 240 may calculate color of a final image by mixing color of calculated pixels, for example, semi-transparent pixels having the same coordinates or pixels having a value of alpha.

In a 3D rendering process, when pixels to be eliminated by a discard or a depth test are detected before a process by the pixel shader 220, the pixel shader 220 may perform minimum operations to improve 3D rendering performance.

Figure 3:
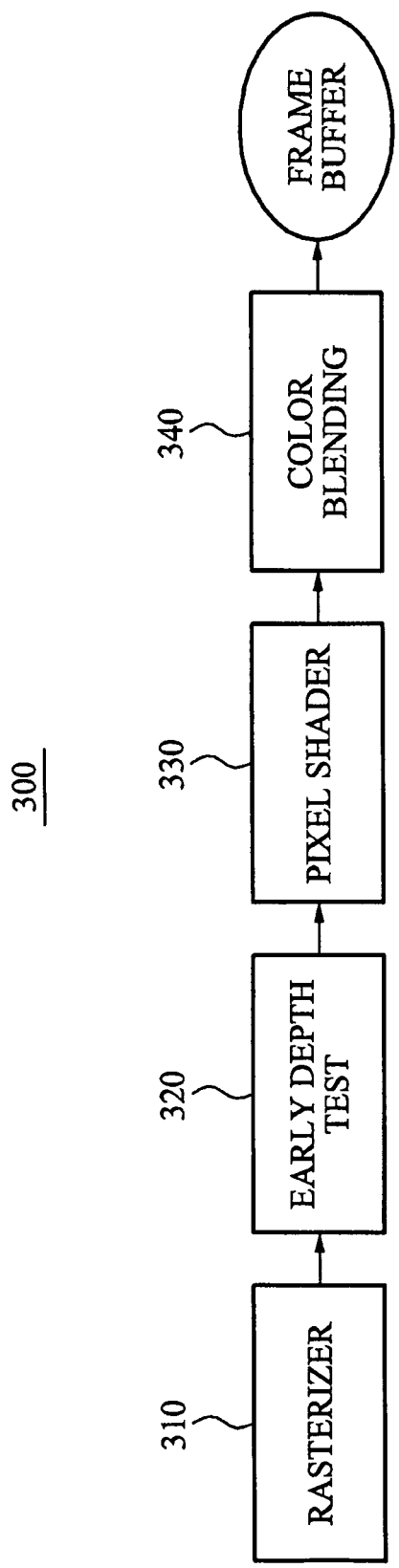
FIG. 3 illustrates a pipeline performing a simple early depth test according to example embodiments.

FIG. 3 illustrates a pipeline performing a simple early depth test according to example embodiments.

When pixels are selectively discarded by a depth test before a process by a pixel shader, a number of pixels to be processed by the pixel shader may decrease, and 3D rendering performance may be improved.

The pipeline 300 performing the simple early depth test may include a rasterizer 310, an early depth test 320, a pixel shader 330, and color blending 340.

The rasterizer 310 and the color blending 340 respectively correspond to the rasterizer 210 and the color blending 240 of FIG. 2. Thus, redundant descriptions are omitted.

The early depth test 320 corresponds to the depth test 230 of FIG. 2, however, is performed before a process by the pixel shader 330. The pixel shader 330 corresponds to the pixel shader 220 of FIG. 2, however, only processes pixels which are not eliminated by the early depth test 320.

When a first pixel which is closest to a camera is eliminated by a discard instruction of the pixel shader 330, a second pixel behind the first pixel is shown. However, when the depth test is performed before the process by the pixel shader 330 to discard a pixel, the second pixel is already discarded by the depth test and is not shown.

Figure 4:
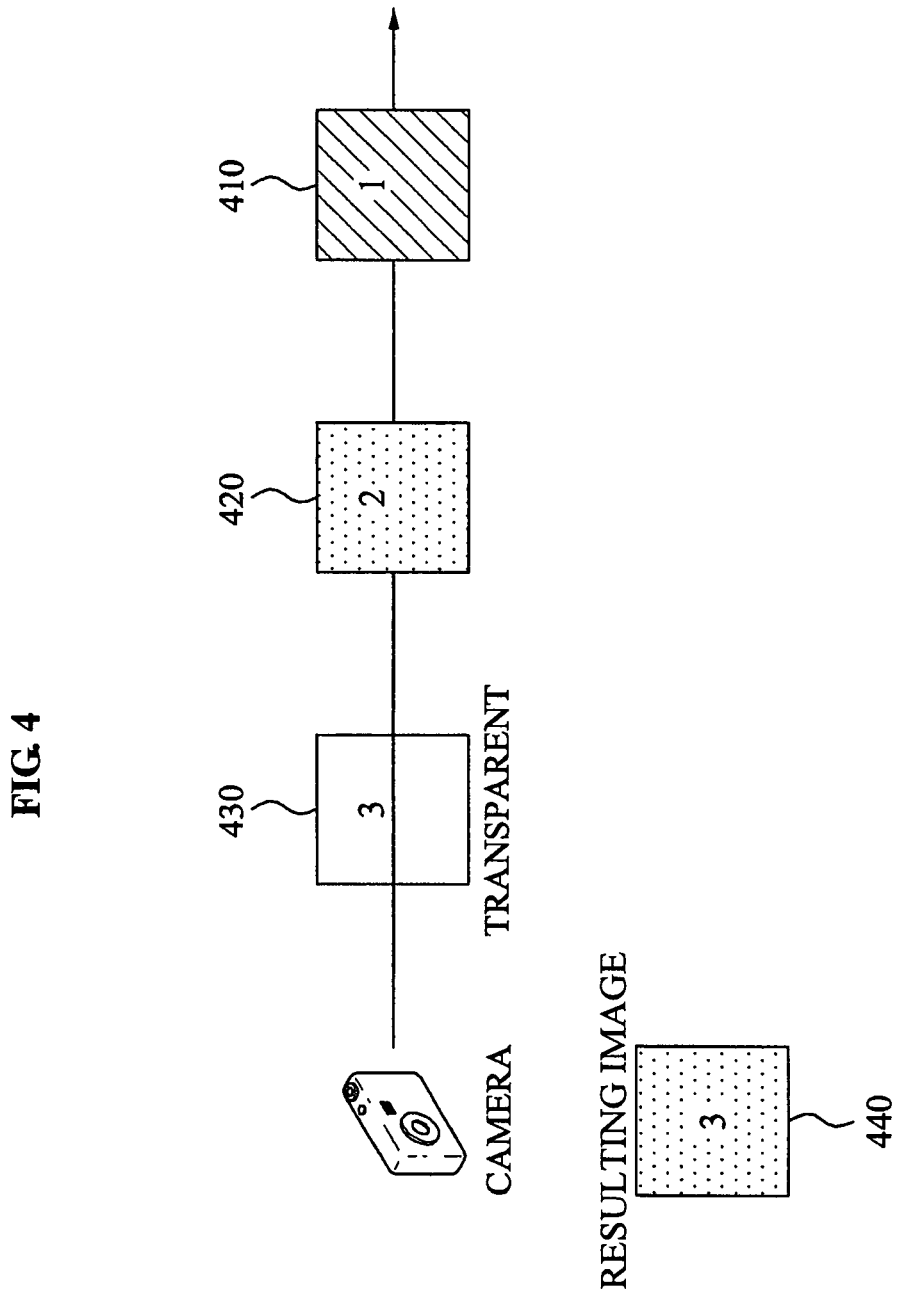
FIG. 4 illustrates a resulting image based on a depth of objects according to example embodiments.
Figure 5:
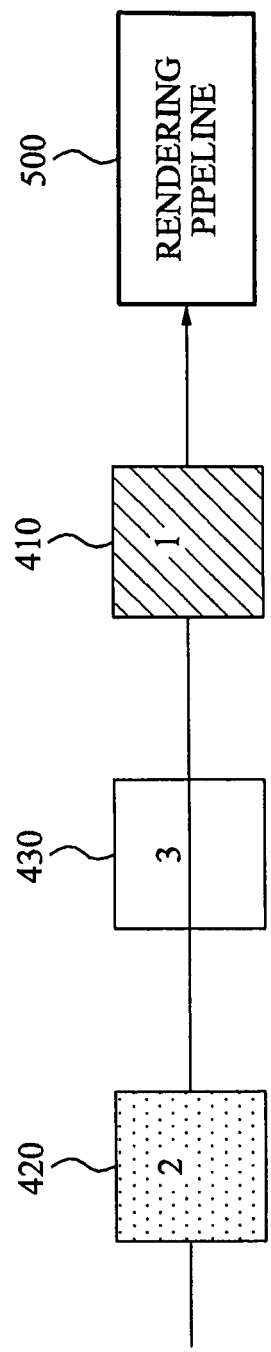
FIG. 5 illustrates processing an object by a rendering pipeline according to example embodiments.
Figure 6:
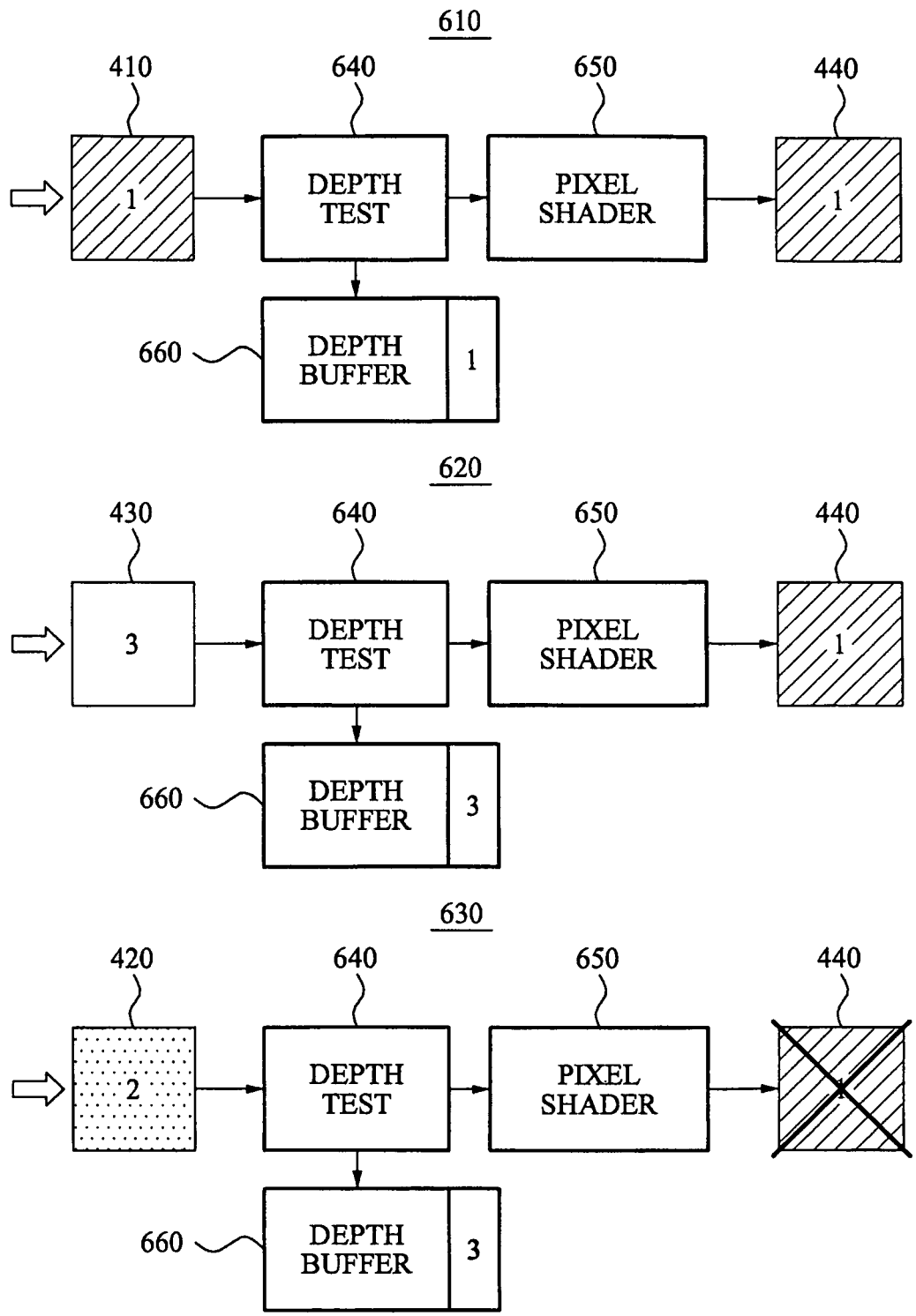
FIG. 6 illustrates problems due to an early depth test and a process by a discard instruction according to example embodiments.

FIGS. 4 to 6 illustrate problems of a depth test and an early depth test according to example embodiments.

FIG. 4 illustrates a resulting image based on a depth of objects according to example embodiments.

Referring to FIG. 4, a first object 410, a second object 420, and a third object 430 are illustrated.

The first object 410 and the second object 420 are opaque objects, and the third object 430 is a transparent object.

The third object 430 may be positioned closest to a camera or an observer. The second object 420 may be positioned between the third object 430 and the first object 410, and the first object may be positioned farthest away from the camera. That is, the third object 430 has a depth value of 3, the second object has a depth value of 2, and the first object 410 has a depth value of 1.

When rendering is performed, an object closest to the camera may be displayed as a resulting image 440. However, according to the example embodiments, because the closest object is transparent, a next closest object that is the second object 420 may be displayed as the resulting image 440. Here, the resulting image 440 has a depth value of 3 that corresponds to the depth value of the transparent third object 430, different from a depth value of 2 that corresponds to the depth value of the second object 420.

FIG. 5 illustrates processing an object by a rendering pipeline according to example embodiments.

Referring to FIG. 5, the first object 410, the second object 420, and the third object 430 of FIG. 4 may be sequentially processed by the rendering pipeline. The first object 410 is processed first, the third object 430 is then processed, and the second object 420 is finally processed.

As shown in FIG. 5, an order of processing the objects may be different from an order of the objects based on the depth values.

FIG. 6 illustrates problems because of the early depth test and a process of a discard instruction according to example embodiments.

Depth test 640 corresponds to the early depth test 320 of FIG. 3. A pixel shader 650 corresponds to the pixel shader 330 of FIG. 3. Thus, redundant descriptions are omitted.

A depth buffer 660 may store a depth value. The depth value may be a depth value of an object displayed in a particular coordinate. The depth value of the depth buffer 660 may be initialized to a value to represent the farthest distance, for example, 0.

Referring to FIG. 6, the three objects or pixels 410, 430, and 420 having the depth values, may be sequentially processed by pipelines 640 and 650. 610, 620, and 630 processing the respective objects may be separately described.

In 610, the first object 410 may be processed.

The first object 410 may have a depth value of 1 that is greater than an initial value stored in the depth buffer 660. Thus, the first object 410 may pass through the depth test 640 and is not discarded by the depth test 640. The depth value of the depth buffer 660 may be updated to 1, which is the depth value of the first object 410.

The first object 410 may pass through the pixel shader 650 and is not discarded by the pixel shader 650. Thus, the resulting image 440 corresponds to the first object 410.

In 620, the third object 430 may be processed.

The third object 430 may have a depth value of 3 which is greater than the initial depth value of 1 stored in the depth buffer 660. Thus, the third object 430 may pass through the depth test 640 and is not discarded by the depth test 640. The depth value of the depth buffer 660 may be updated to 3, which is the depth value of the third object 430.

However, the third object 430 is a transparent object, and as a result the third object 430 is discarded by the pixel shader 650 and does not pass through the pixel shader 650. Thus, the resulting image 440 is still the first object 410.

In 630, the second object 420 is processed.

The second object 420 may have a depth value of 2 which is less than the depth value of 3 stored in the updated depth buffer 660. Thus, the third object 430 may be discarded by the depth test 640 and does not pass through the depth test 640.

Thus, the result image 440 is still the first object 410, which is different from a proper result described above with reference to FIG. 4.

When the early depth test is applied to each of a plurality of objects processed in optional order, and a part of the objects is discarded by a discard instruction, an incorrect image may be generated.

Figure 7:
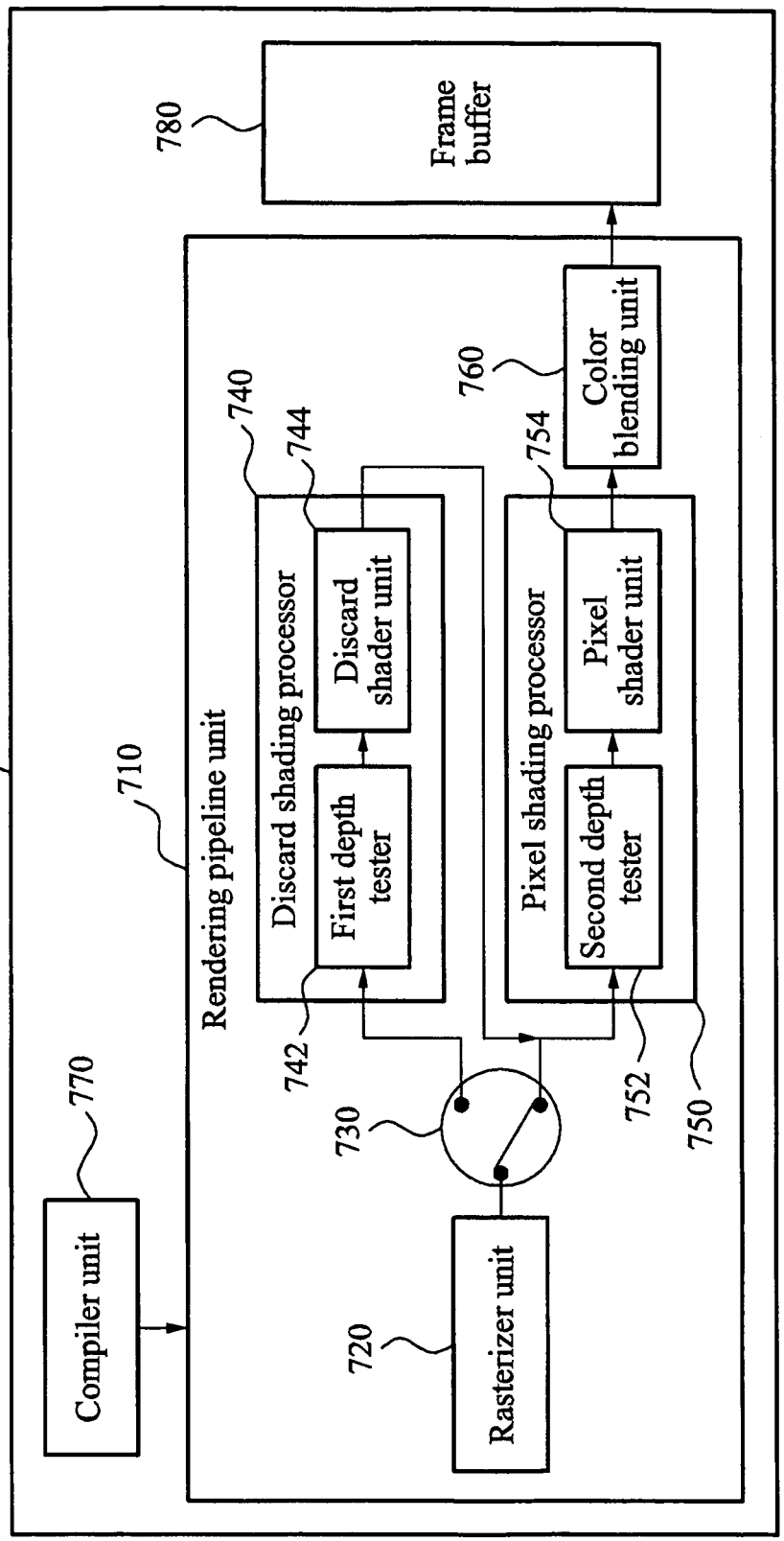
FIG. 7 illustrates a structure of a 3D rendering apparatus according to example embodiments.

FIG. 7 illustrates a structure of a 3D rendering apparatus according to example embodiments.

The 3D rendering apparatus 700 may include a rendering pipeline unit 710, a compiler unit 770, and a frame buffer 780.

The rendering pipeline unit 710 may include a rasterizer unit 720, a discard determination unit 730, a discard shading processor 740, a pixel shading processor 750, and a color blending unit 760. The rendering pipeline unit 710 may further include the primitive processor 120, the vertex shader 130, and the primitive assembly 140 of FIG. 1, or may further include components corresponding to the above components.

The rasterizer unit 720 may perform rasterization on a pixel input to the rendering pipeline unit 710 and output the pixel to the discard determination unit 730.

The discard determination unit 730 may output the input pixel to the discard shading processor 740 when the input pixel is a target to be processed by the discard shading processor 740. The discard determination unit 730 may output the input pixel to the pixel shading processor 750 when the input pixel is different from a target pixel to be processed by the discard shading processor 740.

In other words, the discard determination unit 730 may function as a switch with respect to an input pixel.

The discard determination unit 730 may output the input pixel to the discard shading processor 740 when a pixel shader to process the input pixel includes a discard instruction. The discard determination unit 730 may output the input pixel to the pixel shading processor 750 when the pixel shader to process the input pixel does not include a discard instruction.

The color blending unit 760 may receive a pixel from the pixel shading processor 750 and perform color blending on the pixel. A result of color blending may be output to the frame buffer 780.

The discard shading processor 740 may perform an early depth test maintaining a depth value and process the discard shader to selectively discard an input pixel. The discard shading processor 740 may output an input pixel not discarded to the pixel shading processor 750.

Part of the input pixels is discarded by the early depth test and the discard instruction, but the remaining pixels are output to the pixel shading processor 750.

The discard shading processor 740 may perform the early depth test and does not update a depth value of a depth buffer.

The pixel shading processor 750 may perform an early depth test updating a depth value to selectively discard the pixels and use the pixel shader to process the pixels. That is, part of the input pixels may be discarded by the early depth test. The remaining pixels may be determined to have a final color by the pixel shader, and the pixels having the determined color may be output to the color blending unit 760.

The discard shader may correspond to a part associated with the discard instruction among the entire pixel shader to process an input pixel, and the pixel shader may correspond to another part excluding the part corresponding to the discard shader.

When the entire pixel shader processing an input pixel does not include the discard instruction, the input pixel may be input directly to the pixel shading processor 750 by the discard determination unit 730 instead of going through the discard shading processor 740.

The depth value of the depth buffer may be updated by the pixel shading processor 750, and the updated depth value may be effective for a pixel on which the early depth tests are performed by the discard shading processor 740 and the pixel shading processor 750. In other words, a pixel with a higher depth value may be discarded by the early depth test. Updating the depth value of the depth buffer may be performed after determining whether an input pixel is discarded by the discard instruction.

Further, the depth buffer may be updated before color of a pixel is calculated and other pixels may be compared using parallel pipeline processing based on an updated depth value. Accordingly, efficiency of the early depth test may be improved, and the parallel processing performance of the rendering pipeline unit 710 may be enhanced. Moreover, operation times of the 3D rendering apparatus 700 may be reduced, and a smaller memory bandwidth may be used in the 3D rendering apparatus 700.

The pixel shader used by the pixel shading processor 750 may not include a discard instruction. Thus, the problems because of the early depth test described above with reference to FIG. 6 may not occur. Therefore, a pixel processed by the shader not including the discard instruction may be discarded by the general early depth test of the pixel shading processor 750 because the pixel does not go through the discard shading processor 740.

The discard shading processor 740 may include a first depth tester 742 and a discard shader unit 744.

The first depth tester 742 may perform an early depth test on input pixels to selectively discard input pixels. The first depth tester 742 may not change the depth value of the depth buffer. In other words, the first depth tester 742 may maintain the depth value of the depth buffer corresponding to input pixels.

The discard shader unit 744 may process a discard instruction on input pixels to selectively discard input pixels.

The pixel shading processor 750 may include a second depth tester 752 and a pixel shader unit 754.

The second depth tester 752 may perform a depth test on input pixels to selectively discard input pixels. The second depth tester 752 may update a depth value of the depth buffer corresponding to an input pixel to a depth value of the input pixel when the input pixel passes though the depth test.

The pixel shader unit 754 may use a pixel shader to process pixels not discarded by the second depth tester 752. Pixels may be selectively discarded by the first depth tester 742, the discard shader unit 744, and the second depth tester 752 before the pixels are processed by the pixel shader unit 754. Accordingly, a number of the pixels to be processed by the pixel shader unit 754 may be reduced. Further, operation times by the pixel shader unit 754 and a memory bandwidth used by the pixel shader unit 754 may be reduced. Generally, since the pixel shader unit 754 represents a bottleneck of the 3D rendering apparatus 700, improvement in performance of the pixel shader unit 754 may bring about an improvement in overall performance of the 3D rendering apparatus 700 and a decrease in power consumption.

In order to efficiently process pixels, pixels may be divided into pixels going through the discard shading processor 740 and pixels directly input to the pixel shading processor 750, and general pixel shader code to process the pixels are divided into code corresponding to the discard instruction and code not corresponding thereto.

A programmer programming the general pixel shader code may separately program discard shader code corresponding to the discard instruction and modified pixel shader code not corresponding thereto.

The compiler unit 770 may divide the general pixel shader code with respect to pixels into the discard shader code and the modified pixel shader code. The compiler unit 770 may compile the discard shader code to generate a discard shader, and may compile the modified pixel shader code to generate a pixel shader. The operations may be transparently performed by the programmer.

The discard shader code may correspond to discard instruction code and previous code to the discard instruction among the general pixel shader codes, and the pixel shader code may correspond to subsequent code to the discard instruction among the general pixel shader code.

In order to prevent redundant calculations of the discard shader and the pixel shader, a result of an operation by the discard shader is transmitted to the pixel shader.

The result of the operation, i.e., information or attributes about pixels, may be transmitted from the discard shader code to the pixel shader code by a varying parameter of the discard shader code. As the varying parameter is added to the discard shader, operation times of the 3D rendering apparatus 700 may be reduced. The attributes of the pixels may include positional values of pixels or normal values of pixels.

Functions of the above components 710 to 780 may be performed by a single controller (not shown). The controller may be a single processor or a multi-processor. The above components 710 to 780 may be services, processes, threads, or modules performed by the controller.

FIG. 8 illustrates generation of code of a compiler according to example embodiments.

The compiler unit 770 may generate discard pixel shader code 820 and modified pixel shader code 830 based on original pixel shader code 810.

The compiler unit 770 may analyze the original pixel shader code 810 and divide the original pixel shader code 810 based on an inside discard instruction to generate code 820 and 830.

The original pixel shader code 810 may provide a shader which calculates a color value of only pixels in a circle with respect to pixels generated based on a rectangle and discards pixels outside the circle.

The discard pixel shader code 820 may provide a shader which discards the pixels outside the circle, and the modified pixel shader code 830 may provide a shader which calculates color of the pixels in the circle.

$(4-\pi)r^2$ pixels per rectangle may be discarded early by the discard pixel shader code 820. Pixel shading by the modified pixel shader code 830 may not be performed on the discarded pixels. Thus, operation times of the 3D rendering apparatus 700 may be reduced, and a smaller data bandwidth may be used in the 3D rendering apparatus 700.

A result of an operation by a discard pixel shader, for example, information about pixels may be transmitted to a pixel shader by a new varying parameter. Transmission of the operation result using the varying parameter prevents redundant calculations and may minimize an overhead as a result of the use of two shaders.

Thus, the discard pixel shader code 820 and the modified pixel shader code 830 may include a varying parameter declaration unit 840. The discard pixel shader code 820 may include a part 850 to set a varying parameter value, and the modified pixel shader code 830 may include a part 860 to extract a varying parameter value.

Unnecessary variables may need not be loaded to a memory, and as a result, a smaller memory bandwidth may be used in the 3D rendering apparatus 700.

Figure 9:
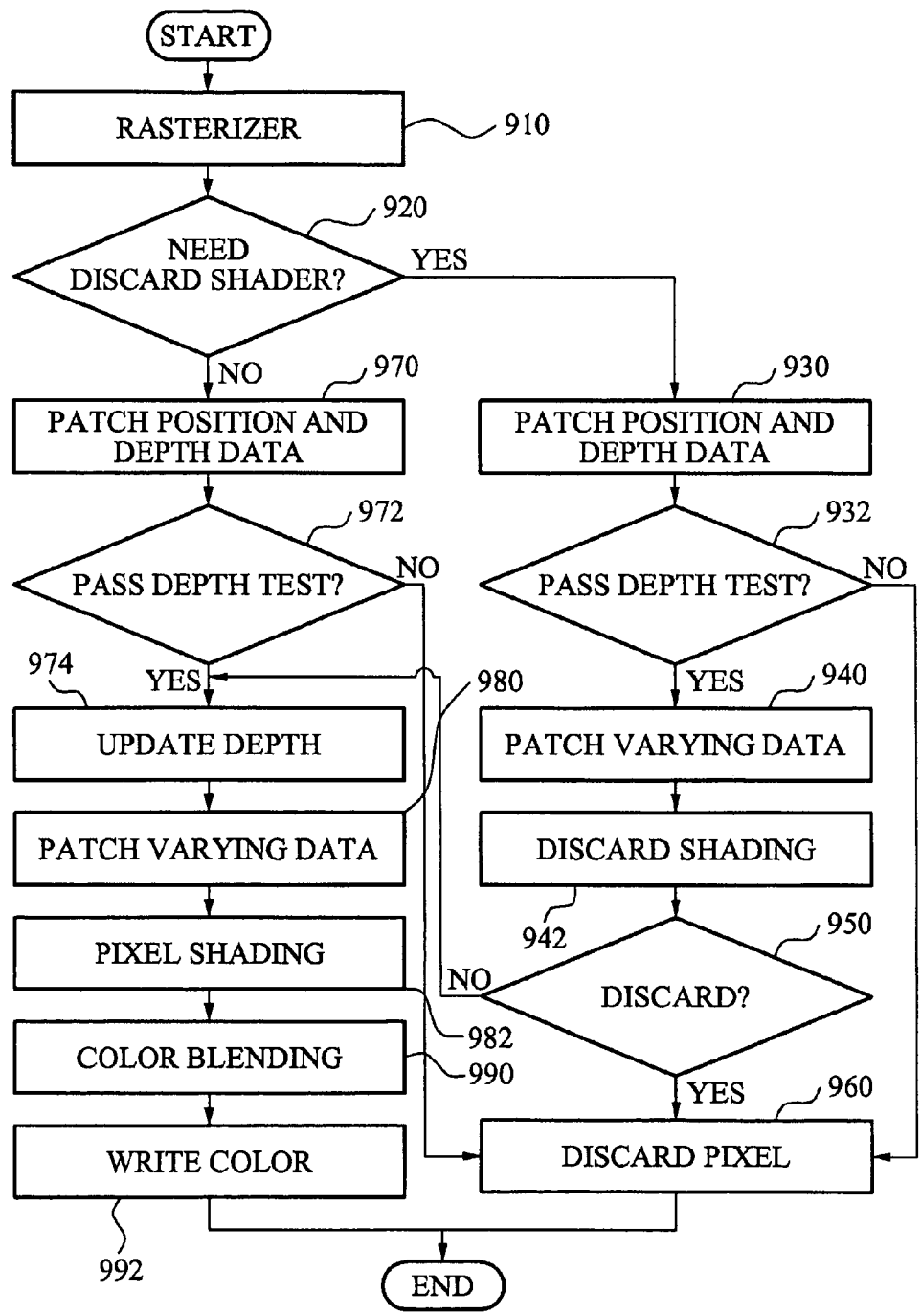
FIG. 9 is a flowchart illustrating a 3D rendering method according to example embodiments.

FIG. 9 is a flowchart illustrating a 3D rendering process according to example embodiments.

In 910, rasterization may be performed on input pixels.

In 920 to determine discarding, it may be determined whether the pixels are targets for a discard shading process in 930 to 960. When the pixels are targets for the discard shading process in 930 to 960, the discard shading process may be performed in 920. When the pixels are different from targets for the discard shading process in 930 to 960, a pixel shading process in 970 to 982 may be performed.

A discard shader may correspond to a part associated with a discard instruction among the entire pixel shader to process pixels. A pixel shader may correspond to another part among the entire pixel shader excluding the part corresponding to the discard shader.

When the pixel shader processing pixels includes the discard instruction, the discard shading process in 930 to 960 may be performed after the determination of discarding in 920. When the pixel shader does not include the discard instruction, the pixel shading process in 970 to 982 may be performed.

The discard shading process in 930 to 960 may perform a process represented by discard shader code, and the pixel shading process in 970 to 982 may perform a process represented by pixel shader code.

The discard shader code may correspond to discard instruction code and previous code to the discard instruction among the entire pixel shader code with respect to pixels, and the pixel shader code may correspond to subsequent code to the discard instruction among the entire pixel shader code.

In the discard shading process in 930 to 960, an early depth test maintaining a depth value may be performed, and a process by the discard shader may be performed to selectively discard pixels.

In 930, position and depth data of pixels may be patched.

Next, in a first depth test in 932, a depth test may be performed on the pixels. When the pixels pass the depth test, i.e., when a depth value of the pixels is greater than a value in a depth buffer, 940 may be performed. When the pixels do not pass the depth test, a pixel discarding process may be performed in 960. Accordingly, in the first depth test in 932, the depth test may be performed on the pixels to selectively discard pixels.

Because the first depth test in 932 is performed before a discard shading in 942 to 950, the depth test in the first depth test in 932 may be an early depth test.

The first depth test in 932 may not include updating a depth value of the depth buffer. Thus, in the first depth test in 932, a depth value of the depth buffer corresponding to a pixel may be maintained.

In a first varying data patch in 940, varying data of the pixels may be patched. In the first varying data patch in 940, information about the pixels may be extracted based on a varying parameter of the discard shader code.

In the discard shading in 942 to 950, pixels not discarded by a first depth tester may be processed by the discard shader and are selectively discarded by processing the discard instruction on the pixels.

In 942, the discard shading may be performed on the pixels.

In 950, it may be determined whether the pixels are discarded. When the pixels are discarded, 960 may be performed. When the pixels are not discarded, a pixel shading process may be performed in 970 to 972.

In the pixel shading process in 970 to 972, an early depth test to update a depth value may be performed to selectively discard pixels, and the pixel shader may be used to process the pixels. The pixels not discarded in the discard shading process in 930 to 960 may be processed in the pixel shading process in 970 to 972.

In 970, position and depth data of the pixels may be patched.

Next, in a second depth test in 972 and 974, a depth test may be performed on the pixels to selectively discard pixels.

In 972, the depth test may be performed on the pixels. When the pixels pass the depth test, i.e., when a depth value of the pixels is greater than a value in a depth buffer, 974 may be performed. When the pixels do not pass the depth test, the pixel discarding process may be performed in 960.

The depth value of the depth buffer may be updated in 974 to a depth value of a pixel passing the depth test. The update is immediately effective in the first depth test in 932 and the second depth test in 972 and 974, which are subsequently performed.

The second depth test in 972 and 974 may be performed before a pixel shading in 982 and thus, the depth test in the second depth test in 972 and 974 is an early depth test.

In a second varying data patch in 980, varying data of the pixels may be patched. In the second varying data patch in 980, information about the pixels may be extracted based on a varying parameter of the pixel shader code.

In the pixel shading in 982, pixels not discarded by the second depth test in 972 and 974 may be processed by the pixel shader.

In a color blending in 990, color blending may be performed on the pixels.

In 992, a color value of the pixels may be written in a frame buffer.

Technical concepts according to example embodiments described above with reference to FIGS. 1 to 8 may be applied to the present embodiments. Thus, detailed descriptions thereof are omitted for clarity and conciseness.

Figure 10:
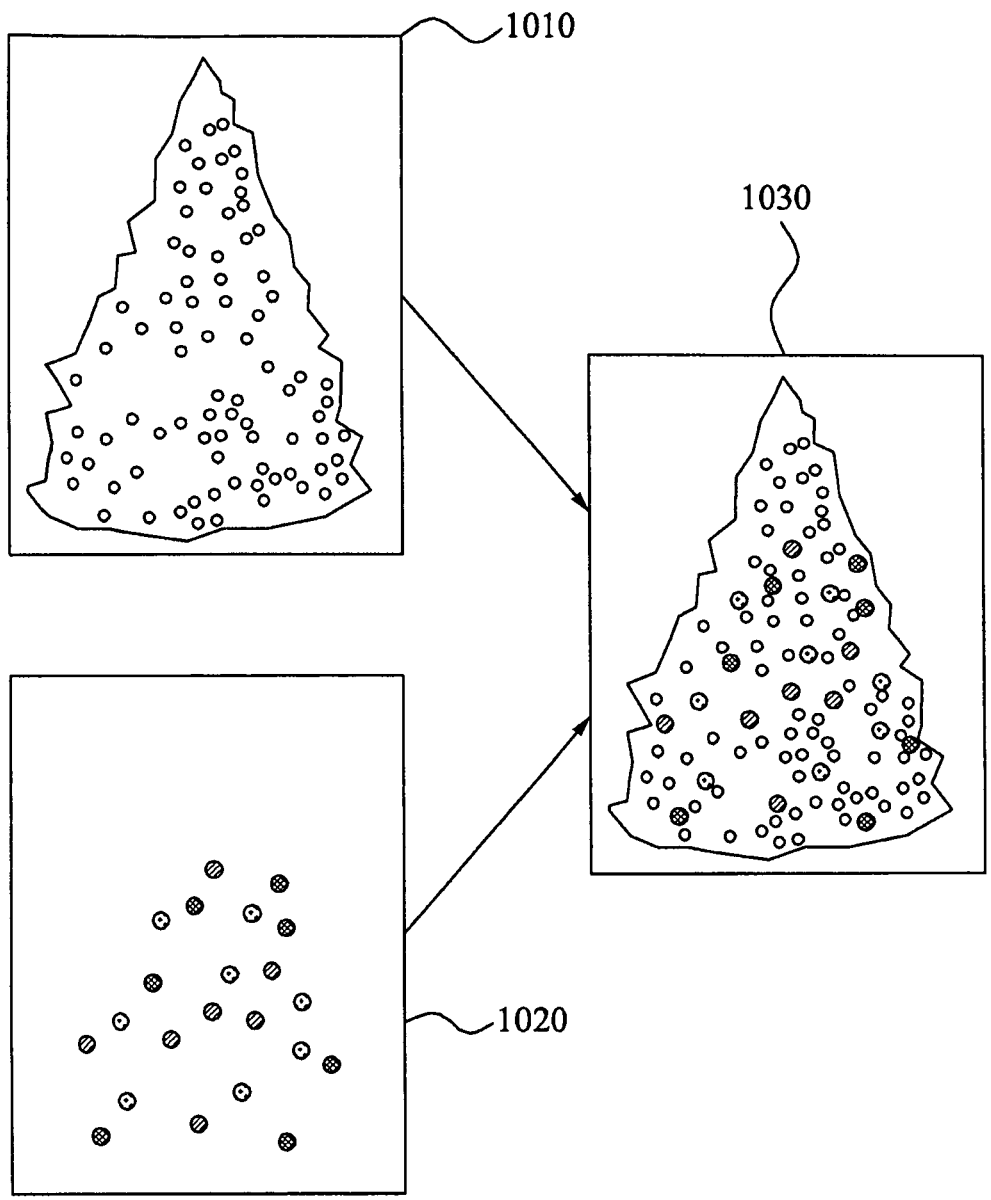
FIG. 10 illustrates a result of a 3D rendering process according to example embodiments.

FIG. 10 illustrates a result of a 3D rendering process according to example embodiments.

FIG. 10 illustrates an image 1010 only processed by the pixel shading processor 740 not including the discard instruction, an image 1020 processed by the discard shading processor 750 including the discard instruction, and an image 1030 which is a combination of the two images 1010 and 1020.

The above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it should be appreciated by those skilled in the art that changes may be made in these embodiments without departing from the principles and spirit of the disclosure, the scope of which is defined by the claims and their equivalents.

What is claimed is:

1. A three-dimensional (3D) rendering apparatus, comprising:
   a discard shading processor that performs a first early depth test maintaining a depth value and processing a discard shader to selectively discard a pixel; and
   a pixel shading processor that performs a second early depth test updating the depth value to selectively discard a remaining pixel, and using a pixel shader to process a second remaining pixel,
   wherein the discard shading processor outputs the remaining pixel to the pixel shading processor.

2. The 3D rendering apparatus of claim 1, wherein the discard shader corresponds to a part associated with a discard instruction, and the pixel shader corresponds to another part excluding the part corresponding to the discard shader.

3. The 3D rendering apparatus of claim 1, wherein the discard shading processor comprises:
   a first depth tester performing the first early depth test on the pixel to selectively discard the pixel; and
   a discard shader unit processing the remaining pixel not discarded by the first depth tester using the discard shader and processing a discard instruction on the remaining pixel to selectively discard the pixel,
   wherein the first depth tester maintains a depth value of a depth buffer corresponding to the pixel.

4. The 3D rendering apparatus of claim 1, wherein the pixel shading processor comprises:
   a second depth tester performing the second early depth test on the pixel to selectively discard the pixel; and
   a pixel shader unit processing the remaining pixel not discarded by the second depth tester using the pixel shader,
   wherein the second depth tester updates a depth value of a depth buffer corresponding to the remaining pixel to a depth value of the discarded pixel when the remaining pixel is discarded.

5. The 3D rendering apparatus of claim 1, further comprising a discard determination unit determining whether a second pixel is a target to be processed by the discard shading processor,
   wherein the discard determination unit outputs the second pixel to the discard shading processor when the second pixel is the target to be processed by the discard shading processor, and outputs the second pixel to the pixel shading processor when the second pixel is different from the target to be processed by the discard shading processor.

6. The 3D rendering apparatus of claim 5, further comprising:
   a rasterizer unit performing rasterization on the pixel and outputting the pixel to the discard determination unit; and
   a color blending unit receiving the second remaining pixel from the pixel shading processor and performing color blending on the pixel.

7. The 3D rendering apparatus of claim 5, wherein the discard determination unit outputs the pixel to the discard shading processor when the pixel shader to process the pixel comprises the discard instruction, and outputs the remaining pixel to the pixel shading processor when the pixel shader does not comprise the discard instruction.

8. The 3D rendering apparatus of claim 5, further comprising a compiler unit dividing all pixel shader code with respect to the pixel into discard shader code and pixel shader code, compiling the discard shader code to generate the discard shader, and compiling the pixel shader code to generate the pixel shader,
   wherein the discard shader code corresponds to discard instruction code and previous code to the discard instruction among the all pixel shader code, and the pixel shader code corresponds to subsequent code to the discard instruction among the all pixel shader code.

9. The 3D rendering apparatus of claim 8, wherein information about the pixel is transmitted from the discard shade code to the pixel shader code by a variable in the discard shader code.

10. The 3D rendering apparatus of claim 1, a rasterizer unit performing rasterization on the pixel and outputting the pixel to the discard shading processor.

11. A three-dimensional (3D) rendering method, comprising:
    a discard shading process performing, by at least one processor, a first early depth test maintaining a depth value and processing a discard shader to selectively discard a pixel; and
    a pixel shading process performing, by the at least one processor, a second early depth test updating the depth value to selectively discard a remaining pixel, and using a pixel shader to process a second remaining pixel, wherein the remaining pixel not discarded in the discard shading process is processed in the pixel shading process.

12. The 3D rendering method of claim 11, wherein the discard shader corresponds to a part associated with a discard instruction, and the pixel shader corresponds to another part, excluding the part corresponding to the discard shader.

13. The 3D rendering method of claim 11, wherein the discard shading process comprises:

a first depth testing performing the first early depth test on the pixel to selectively discard the pixel; and a discard shading processing the remaining pixel not discarded by the first early depth test using the discard shader and processing a discard instruction on the remaining pixel to selectively discard the remaining pixel, wherein the first depth testing maintains a depth value of a depth buffer corresponding to the remaining pixel.

14. The 3D rendering method of claim 11, wherein the pixel shading processor comprises:

a second depth testing performing the second early depth test on the remaining pixel to selectively discard the remaining pixel; and a pixel shading processing the second remaining pixel not discarded by the second early depth test using the pixel shader, wherein the second depth testing updates a depth value of a depth buffer corresponding to the second remaining pixel to a depth value of the discarded pixel when the pixel is discarded.

15. The 3D rendering method of claim 11, further comprising a discard determining process to determine whether a second pixel is a target to be processed in the discard shading process, wherein the discard shading process is performed when the second pixel is the target to be processed in the discard shading process, and the pixel shading process is performed when the second pixel is different from the target to be processed in the discard shading process.

16. The 3D rendering method of claim 15, further comprising:

a rasterizing process performing rasterization on the pixel; and a color blending process performing color blending on the second remaining pixel.

17. The 3D rendering method of claim 15, wherein the discard shading process is performed after the discard determining process when the pixel shader to process the pixel comprises the discard instruction, and the pixel shading process is performed when the pixel shader does not comprise the discard instruction.

18. The 3D rendering method of claim 15, wherein the discard shading process performs a process represented by discard shader code, and the pixel shading process performs a process represented by pixel shader code, wherein the discard shader code corresponds to discard instruction code and previous code to a discard instruction among all pixel shader code with respect to the pixel, and the pixel shader code corresponds to subsequent code to the discard instruction among the all pixel shader code.

19. The 3D rendering method of claim 18, wherein the discard shading process comprises a first varying data patching process extracting information about the pixel based on a variable in the discard shader code, and the pixel shading process comprises a second varying data patching process extracting information about the pixel based on a variable in the pixel shader code.

20. At least one non-transitory computer-readable medium comprising computer readable instructions that control at least one processor to implement the three-dimensional (3D) rendering method of claim 11.

* * * * *